United States Patent Office 2,881,162
Patented Apr. 7, 1959

2,881,162
RECOVERY PROCESS

Otto F. Walasek, Zion, Ill., assignor to Abbott Laboratories, North Chicago, Ill., a corporation of Illinois No Drawing. Application November 16, 1953
Serial No. 392,497

12 Claims. (Cl. 260—210)

The present invention relates to a process of recovering erythromycin in a purified form and more particularly to an improved process of recovering erythromycin base from its fermentation broth in a highly purified form.

Erythromycin is an antibiotic obtained by culturing a strain of Streptomyces erythreus in a culture medium containing an assimilable source of carbohydrates, nitrogen, and inorganic salts and recovering the erythromycin from the culture medium.

Erythromycin base and its acid addition salts are characterized by a relatively wide bacterial spectrum. They possess antibiotic activity against many microorganisms, both Gram-positive and Gram-negative. A further important antibiotic property of the compounds is their ability to inhibit the growth and development of certain of the Rickettsial bodies and large viruses, for example, epidemic typhus, and meningopneumonitis, and to inhibit effectively the growth and development of some of the spirochetes. The antibiotic properties of the compounds together with their low toxicities make them of great utility as therapeutic agents in the treament of many diseases.

It is highly desirable to prepare erythromycin base containing products by normal commercial production methods with minimum loss of erythromycin activity and having a sufficiently high purity so that the product can be distributed through normal commercial channels without substantial loss of initial potency. In order to achieve the foregoing, the isolation procedure of erythromycin must be as simple and direct as possible while at the same time producing a product of high erythromycin activity. Erythromycin recovery processes which have previously been employed fail to yield an erythromycin product having the desired degree of purity and do not possess the desired simplicity.

It is therefore an object of the present invention to provide a more efficient and simplified process of recovering erythromycin from solutions thereof in a highly purified form.

It is a further object of the present invention to provide a process of isolating erythromycin in a highly purified form from erythromycin fermentation broth.

It is a still further object of the present invention to provide an improved process of recovering erythromycin in the form of its base in a highly purified form.

Other objects of the invention will be apparent from the detailed description and claims to follow.

Heretofore the preferred method of recovering erythromycin from its fermentation broth in the form of its base has been to make the filtered culture broth alkaline to a pH of about 9 to 10, preferably about pH 9.5, and to extract the adjusted broth with an alkyl acetate, such as amyl acetate. The erythromycin base which dissolves in amyl acetate is then extracted into water by adjusting the pH to below pH 6.5, preferably to about pH 5, and the aqueous extract at pH 7.0 reduced in volume by evaporation in vacuo to incipient precipitation. The mixture is then made alkaline to about pH 9.5, whereupon erythromycin base separates in solid, usually crystalline form. The crude base is isolated by filtration or centrifuging and is purified by recrystallization.

It has been discovered that an improved erythromycin product can be obtained by treating at a suitable alkaline pH an aqueous solution of an erythromycin salt with a water-miscible organic solvent in which erythromycin is relatively very soluble having a suitable concentration of a salting out agent and heating to cause a phase separation with the erythromycin product being extracted substantially quantitatively into the organic solvent phase and crystallizing the erythromycin base from the solvent solution by the addition of water.

In the preferred form of the present invention an erythromycin salt solution, such as erythromycin acetate or erythromycin sulfate from erythromycin fermentation broth, having a concentration of about 40,000 units erythromycin per ml. at a pH of at least about 8.5 is stirred with an organic solvent for the erythromycin, such as acetone, ethyl alcohol, and isopropyl alcohol, and a highly water soluble inorganic salt as a salting out agent, such as sodium chloride, said salt being present at a concentration of at least about 200 grams per liter of the original erythromycin salt solution. The resulting agitated solution is then, either before or after heating, adjusted to an alkaline pH of at least between about pH 9.5 to 11.0 and heated to a temperature of between 35° and 45° C.; whereupon a phase separation is effected with substantially the entire erythromycin activity being contained in the acetone phase and the salt constituents being contained in the aqueous phase. It is preferable to initially adjust the pH of the erythromycin salt solution to about pH 8.5, and then heat to a temperature of between about 35–45° C., add the said organic solvent and salting out agent, and then finally adjust the pH of the mixture to between pH 10 and 10.8. Thereafter, to the recovered acetone phase which has a concentration of about 200,000 to 300,000 units erythromycin per ml. at a temperature of about 35–45° C. is added sufficient water to cause the acetone solution to become turbid at about 45° C. and the solution is cooled to about 15–20° C. and allowed to crystallize at room temperature or below without agitation for about 12 hours. The solution is then filtered, the crystals washed with acetone at a temperature of about 10–15° C., and dried in vacuo at about 70° C. The crystalline erythromycin base thus obtained has a bio-potency of at least about 900 units erythromycin per mg.

The following specific examples illustrate the preferred form of the invention and should not be construed to limit the invention to the precise reagents disclosed or proportions employed.

Example 1

A solution of unclarified erythromycin acetate salt (325 gallons) having a concentration of 44,200 units erythromycin per ml. as determined by polarimetric assay at a pH of 7.5 and at a temperature of 6° C. is mixed while agitating with the following ingredients in the order listed:

145 gallons acetone
14 liters of 10% sodium hydroxide
810 pounds sodium chloride
23 liters of 10% sodium hydroxide The pH of the solution after the addition of the final increment of sodium hydroxide solution is about pH 10.5. The mixture is heated to 35° C. with thorough agitation whereupon the acetone solution of erythromycin base separates from the aqueous phase containing the sodium chloride. Seventy gallons of acetone are obtained containing in excess of 99% of the erythromycin activity of the original erythromycin salt solution. The erythromycin enriched acetone solution is sterile filtered at 40° C. and thereafter sterile water is added at 40° C. while thoroughly agitating until a slight turbidity appears in the solution. The agitation is stopped and the solution cooled to 5° C. The crystals are filtered, washed with cold 40% acetone, dried in vacuo at 65° C. for 24 hours, milled, and packaged. A yield of 80.5% erythromycin base having a bio-potency of 892 units of erythromycin per mg. is obtained from the original erythromycin acetate salt solution.

*Example II*

An erythromycin acetate salt solution (297 gallons) having a bio-potency of 37,000 units of erythromycin per ml. is slurried at pH 7.5 with 15 pounds of Hyflo filter aid and 6 pounds of Nuchar C–190N carbon to produce a clear filtrate. The clarified erythromycin salt solution is admixed with the following ingredients in the order listed:

157 gallons acetone
10% sodium hydroxide solution to pH 8.5
870 pounds sodium chloride
10% sodium hydroxide solution to pH 10.8

The foregoing mixture is heated to 40° C. with agitation. Agitation is terminated and the erythromycin-containing acetone solution separates from the aqueous sodium chloride solution. The erythromycin base enriched acetone solution is sterile filtered at 40° C. and diluted with 46 gallons of water whereupon the solution becomes turbid and crystallization takes place. The solution is slowly cooled without agitation to about 20° C. The crystals of erythromycin base formed are filtered, washed with cold 50% acetone, dried in vacuo at 70° C., milled, and packaged. A yield of 76% erythromycin base having an anhydrous bio-potency of 914 units erythromycin per mg. is obtained based on the unclarified erythromycin acetate salt solution.

*Example III*

Erythromycin acetate salt solution (1200 ml.) having a bio-potency of 40,200 units erythromycin per ml. is agitated at a temperature of 38° C. with the following ingredients in the order listed:

510 ml. acetone
320 g. sodium chloride
20% sodium hydroxide solution to pH 10.5

The mixture is agitated for 15 minutes after the ingredients have been added. Agitation is stopped and the acetone layer containing the erythromycin activity separates from the aqueous salt phase. The acetone phase (300 ml.) containing 156,250 units erythromycin per ml. represents 97.3% of the original erythromycin activity contained in the erythromycin acetate salt solution. The acetone solution of the erythromycin base at 30° C. is admixed with 220 ml. of water at 40° C. to give a turbid solution from which the erythromycin base begins to crystallize immediately. The solution is allowed to crystallize without agitation for about 12 hours at room temperature. The crystals are filtered, washed with 50% acetone at 20° C., and the crystals dried in vacuo at 70° C. for 24 hours. A yield of 83.4% of the erythromycin base having an anhydrous bio-potency of 918 units erythromycin per mg. is obtained based on the original erythromycin acetate salt solution.

*Example IV*

An erythromycin acetate salt solution (14 liters) having a bio-potenecy of 54,000 units of erythromycin per ml. is obtained from an erythromycin fermentation broth by extracting the said broth at about pH 10 with amyl acetate and then extracting the erythromycin therefrom with water having the pH thereof adjusted to about pH 5 with acetic acid. The said salt solution is agitated at 35° C .with the following ingredients in the order listed:

6200 ml. acetone
4400 g. sodium chloride
10% sodium hydroxide solution to pH 10.8

The mixture is agitated for 15 minutes at 35° C. and thereafter the agitation is terminated and the mixture separates into an erythromycin base enriched acetone phase and an aqueous sodium chloride salt phase. A second extraction with 1500 ml. acetone of the aqueous layer is made at 35° C. to obtain additional erythromycin base. The two acetone extractions are combined, filtered, and diluted to 1500 ml. acetone. To 300 ml. of the combined acetone extract is added 300 ml. of water at 40° C. causing the solution to become turbid and initiate crystallization. The solution is placed in a cold room overnight at approximately 5° C. The crystals are filtered, washed with cold 50% acetone and dried in vacuo at 70° C. A yield of 81% erythromycin base crystals having an anhydrous bio-potency of 984 units erythromycin per mg. is obtained.

*Example V*

An erythromycin acetate salt solution (2500 ml.) having a bio-potency of 29,500 units erythromycin per ml. at 35° C. is agitated with the following ingredients in the order listed:

375 ml. isopropyl alcohol
950 grams sodium chloride
10% sodium hydroxide solution to pH 10.5

The mixture is agitated for 15 minutes at 35° C. and thereafter the mixture separates into an erythromycin enriched isopropyl alcohol phase and an aqueous sodium chloride phase. The said isopropyl alcohol phase containing the erythromycin is admixed with sufficient water to cause the solution to become turbid. The solution is then placed in a cold room until crystallization is complete. Thereafter the solution is filtered, the crystals washed with 50% cold isopropanol and dried in vacuo at 70° C. Crystals of erythromycin base are obtained having a bio-potency of 900 units erythromycin per mg.

*Example VI*

An erythromycin acetate salt solution (1200 ml.) having a bio-potency of 40,200 units erythromycin per ml. at 35° C. is agitated with the following ingredients in the order listed:

510 ml. acetone
320 grams sodium chloride
20% sodium hydroxide solution to pH 10.5

The mixture is agitated for 15 minutes at 35° C. and upon termination of the agitation the mixture separates into an erythromycin enriched acetone phase and an aqueous sodium chloride phase. The acetone phase containing erythromycin base is isolated and cooled to about 2° C. in a cold room, whereupon crystallization of erythromycin base from the acetone solvent is substantially complete. The solution is then filtered, the crystals washed with anhydrous acetone at about 0° C., and the crystalline erythromycin base dried in vacuo at about 70° C. to give an erythromycin base having a bio-potency of 895 units erythromycin per mg. and a yield of 71% based on the weight of the original erythromycin acetate solution.

In the foregoing specific examples illustrating the preferred embodiment of the present invention, the erythromycin is precipitated from the organic solvent solution by the addition of water as this procedure causes the precipitation of erythromycin in a crystal form which has particularly good filtration characteristics. It should be understood, however, that the erythromycin activity can be recovered from the organic solvent solution by various other procedures. For example, the addition of an organic hydrocarbon, such as Skellysolve C, causes the erythromycin to precipitate from the organic solvent solution. Alternatively, the erythromycin activity can be recovered from the solvent solution as an acid salt of erythromycin by the addition of an acid, such as palmitic acid, which causes the formation and precipitation of an erythromycin salt having a relatively low solubility in the organic solvent. It is also possible to recover the erythromycin base from the organic solvent solution simply by cooling and allowing sufficient time for the erythromycin base to precipitate.

While the specific examples illustrating the preferred form of the present invention employ acetone as the organic solvent for the erythromycin base, it is possible to use with equal effectiveness other common water-miscible organic solvents in which the erythromycin base is soluble, including alcoholic solvents such as ethyl alcohol, isopropanol, and tertiary butanol. Other well-known organic solvents can be used in addition to the foregoing solvents as will be evident to one skilled in the art. Also, other salting out agents such as inorganic salts having a relatively high solubility in water can be used in the foregoing process, including calcium chloride and ammonium sulfate. It should also be understood that the pH of the erythromycin solution can be adjusted with potassium hydroxide as well as sodium hydroxide or other well-known alkaline reagents employed to adjust the pH to between about 8.5 and 11, as those skilled in the art can readily determine.

Others may readily adapt the invention for use under various conditions of service, by employing one or more of the novel features disclosed or equivalents thereof. As at present advised with respect to the apparent scope of my invention, I desire to claim the following subject matter.

I claim:

1. In a process of recovering erythromycin base relatively free of impurities, the steps comprising: admixing an aqueous solution of a crude erythromycin salt with a water-miscible organic solvent in which the erythromycin is relatively soluble while maintaining the pH at about 8.5 and the temperature between about 35° C. and 45° C., adding an inorganic salt which is relatively soluble in water to cause a separation of the said organic solvent solution from the water phase containing the said inorganic salt, adjusting the pH of the said solution to between about pH 9.5 and 11 while maintaining the temperature of the said solution to between about 35° C. and 45° C., whereby the said organic solvent solution containing the erythromycin separates from the water phase containing the said salt; separating the said organic solvent solution from the said water phase; and crystallizing the erythromycin base from the said organic solvent solution relatively free of impurities.

2. A process substantially as defined in claim 1 wherein the erythromycin is recovered from the organic solvent solution by the step comprising cooling the said solvent solution to below about 20° C., whereby the erythromycin is precipitated from solution relatively free of impurities.

3. A process substantially as described in claim 1 wherein the said organic solvent is acetone.

4. A process substantially as described in claim 1 wherein the said organic solvent is isopropyl alcohol.

5. A process of recovering erythromycin base relatively free of impurities, which comprises: admixing an aqueous solution of a crude erythromycin salt with a water-miscible organic solvent in which erythromycin is relatively soluble while maintaining the pH at about 8.5 and the temperature between about 35° C. and 45° C., said solvent being present in an amount of at least about 35% by volume of the said aqueous solution, adding an inorganic salt relatively soluble in water at a concentration of at least about 200 grams per liter of the said aqueous solution, adjusting the pH of the said solution to between about pH 9.5 and 11 while maintaining the temperature of the said solution between about 35° C. and 45° C., whereby the organic solvent solution containing the erythromycin base separates from the water phase containing the said salt; separating the said organic solvent solution from the aqueous phase; adding to the said organic solvent solution containing the erythromycin base sufficient water to cause the said solution to become turbid; and recovering the erythromycin base which crystallizes therefrom relatively free of impurities.

6. A process substantially as defined in claim 3 wherein the turbid erythromycin-containing organic solvent solution is cooled to between about 15° C. and 20° C. to facilitate crystallization of the erythromycin base, and recovering the erythromycin base relatively free of impurities.

7. A process of recovering erythromycin base relatively free of impurities, which comprises: admixing an aqueous solution of a crude erythromycin salt having a pH adjusted to about pH 8.5, heating the adjusted aqueous solution to a temperature of between about 35° C. and 45° C., adding a water miscible organic solvent in which the erythromycin is relatively soluble in an amount comprising at least about 35% by volume of the said aqueous solution and an inorganic salt relatively soluble in water in a concentration of at least about 200 grams per liter of the said aqueous solution, adjusting the pH of the mixture to between about pH 10 and 10.8, whereby the organic solvent solution containing the erythromycin separates from the aqueous phase containing the said inorganic salt; adding water to the said organic solvent solution at a temperature of between about 35° C. and 45° C. until the solution becomes turbid; and recovering the crystalline erythromycin base therefrom relatively free of impurities.

8. A process of recovering erythromycin base relatively free of impurities, which comprises: admixing an aqueous erythromycin salt solution with acetone comprising at least about 35% by volume of the said salt solution while maintaining the pH at about 8.5 and the temperature between about 35° C. and 45° C., adding thereto sodium chloride in a concentration of at least about 200 grams per liter of the said salt solution, adjusting the said solution to an alkaline pH of between about pH 9.5 and 11 while maintaining the said solution at a temperature of between about 35° C. and 45° C., whereupon the acetone solution containing erythromycin base separates from the aqueous phase containing the sodium chloride; separating the said acetone solution from the said aqueous phase; adding water to the acetone solution at a temperature of between about 35° C. and 45° C. to cause the acetone solution to become turbid; cooling the said solution to cause precipitation of the erythromycin base therefrom; and recovering the crystalline erythromycin base relatively free of impurities.

9. A process of recovering erythromycin base relatively free of impurities, which comprises: admixing an aqueous erythromycin salt solution with at least about 35% by volume acetone based on the volume of the said salt solution, adjusting the pH of the said solution to about pH 8.5 by the addition of sodium hydroxide, adding sodium chloride to the said solution in an amount comprising at least about 200 grams per liter of the said salt solution, adjusting the pH of the solution to about pH 10.5 by the addition of sodium hydroxide, and heating the said solution to a temperature between about 35° C. and 45° C. with agitation, whereby the acetone solution containing the erythromycin base separates from the aqueous phase containing the sodium chloride; separating the said acetone solution from the said aqueous phase; adding water to the acetone solution at a temperature between about 35° C. and 45° C. until the solution becomes turbid; cooling the said solution to cause precipitation of the erythromycin base therefrom; and recovering the crystalline erythromycin base substantially free of impurities.

10. A process of recovering erythromycin base relatively free of impurities, which comprises: admixing an aqueous erythromycin acetate solution with acetone comprising at least about 35% by volume based on the said erythromycin acetate solution and sodium chloride in an amount comprising about 220 grams per liter of the said erythromycin solution, adjusting the pH of the said solution to about pH 10.8 by the addition of sodium hydroxide solution, and heating the said solution with agitation to about 35° C., whereupon the solution separates into an erythromycin base-containing acetone phase and a sodium chloride-containing aqueous phase; separating the said acetone phase from the said aqueous phase; adding water to the said acetone phase at a temperature of about 40° C. to cause the solution to become turbid; cooling the said solution to below about 20° C. to complete crystallization of the erythromycin base; and recovering the crystalline erythromycin base relatively free of impurities.

11. A process of recovering erythromycin base from erythromycin fermentation broth relatively free of impurities, which comprises: extracting an erythromycin fermentation broth at about pH 10 with an organic solvent in which the erythromycin in soluble and forming an aqueous erythromycin salt solution therefrom by treating the said solvent containing the erythromycin with water which has been adjusted to about pH 5 with a water soluble acid which forms a water soluble erythromycin salt, admixing the said aqueous erythromycin salt solution with a water-miscible organic solvent in which erythromycin is relatively soluble while maintaining the pH at about 8.5 and the temperature between about 35° C. and 45° C., said solvent being present in an amount of at least about 35% by volume of the said aqueous solution, adding an inorganic salt relatively soluble in water at a concentration of at least about 200 grams per liter of the said aqueous solution, adjusting the pH of the said solution to between about pH 9.5 and 11 while maintaining the temperature of the said solution between about 35° C. and 45° C., whereby the organic solvent solution containing the erythromycin base separates from the water phase containing the said salt; separating the organic solvent solution from the aqueous phase; adding to the said organic solvent solution containing the erythromycin base sufficient water to cause the said solution to become turbid; and recovering the erythromycin base which crystallizes therefrom relatively free of impurities.

12. A process of recovering erythromycin base from erythromycin fermentation broth relatively free of impurities, which comprises: extracting an erythromycin fermentation broth at about pH 10 with amyl acetate and forming an aqueous erythromycin acetate solution by extracting the amyl acetate erythromycin solution with water the pH of which has been adjusted to about pH 5 with acetic acid, admixing the said aqueous erythromycin acetate solution at about a pH of at least 8.5 and at a temperature between about 35° C. and 45° C. with acetone comprising at least about 35% by volume of the said acetate solution and adding thereto sodium chloride in a concentration of at least about 200 grams per liter of the said acetate solution, adjusting the pH to about 9.5 and below pH 11 while maintaining the said solution at a temperature of between about 35° C. and 45° C., whereupon the acetone solution containing erythromycin base separates from the aqueous phase containing the sodium chloride; separating the said acetone solution from the said aqueous phase; adding water to the acetone solution at a temperature of between about 35° C. and 45° C. to cause the acetone solution to become turbid; cooling the said solution to cause precipitation of the erythromycin base therefrom; and recovering the crystalline erythromycin base relatively free of impurities.

References Cited in the file of this patent

UNITED STATES PATENTS

| | | |
|---|---|---|
| 2,474,758 | Peck | June 28, 1949 |
| 2,482,055 | Duggar | Sept. 13, 1949 |
| 2,628,186 | Shive | Feb. 10, 1953 |
| 2,653,899 | Bunch et al. | Sept. 29, 1953 |

OTHER REFERENCES

Craig: J. Biol. Chem., 1945, pp. 321–332.
De Saint-Rat: Chem. Abst., 1946, vol. 40, p. 4104.
Craig: J. Biol., 1947, pp. 665–671.
Berger et al.: J.A.C.S., vol. 73, No. 11, November 1951, p. 5295.